US007475465B1

(12) United States Patent
Weiss

(10) Patent No.: US 7,475,465 B1
(45) Date of Patent: Jan. 13, 2009

(54) COMPRESSION SLEEVE REMOVING APPARATUS

(76) Inventor: James Weiss, 21582 Calle Otono, Lake Forest, CA (US) 92630

( * ) Notice: Subject to any disclaimer, the term of this patent is extended or adjusted under 35 U.S.C. 154(b) by 190 days.

(21) Appl. No.: 11/648,347

(22) Filed: Dec. 28, 2006

(51) Int. Cl.
*B23P 19/04* (2006.01)

(52) U.S. Cl. .............................. 29/264; 28/270; 28/255

(58) Field of Classification Search ................... 29/264, 29/255, 263, 275, 270, 283, 280
See application file for complete search history.

(56) References Cited

U.S. PATENT DOCUMENTS 3,154,842 A 11/1964 Reel
3,653,114 A 4/1972 Bawden
3,708,855 A 1/1973 Whiteside
3,748,718 A * 7/1973 Russell ........................ 29/283
5,519,929 A 5/1996 Bleckman
5,887,328 A * 3/1999 Rydin et al. .................. 29/259
5,890,271 A * 4/1999 Bromley et al. ............... 29/263
6,427,304 B2 * 8/2002 Kaibach et al. ............... 29/263
6,637,089 B1 10/2003 English
6,904,660 B2 6/2005 English
7,322,087 B1 * 1/2008 Hu .............................. 29/261
2003/0188410 A1 10/2003 English
2004/0031139 A1 2/2004 English

* cited by examiner

*Primary Examiner*—Lee D Wilson
(74) *Attorney, Agent, or Firm*—Dennis W. Beech

(57) ABSTRACT

The present invention is used for removal of compression sleeves from cylindrical objects. An outer body may have a bore longitudinally therethrough, an exteriorly threaded attachment end, and a second end with an interior wall of the bore threaded adjacent the second end. An inner element may have a bore longitudinally therethrough and may have a threaded end for threadable engagement with the outer body threaded interior wall. A push rod may have a force portion for insertion in the inner element bore and may be attached to the inner element. A push portion of the push rod may be slidably disposed in the outer body bore when the inner element may be threadably engaged in the outer body. The inner element may have a torque portion.

8 Claims, 1 Drawing Sheet

COMPRESSION SLEEVE REMOVING APPARATUS

BACKGROUND OF THE INVENTION

This invention relates to apparatus for removal of compression sleeves or gaskets from pipes, for example, copper pipes, where the compression sleeve may seal a water pipe end that may have a faucet, valve, joint or other device attached. The new compression sleeve removing apparatus may have a push rod to abut a pipe end and a rotational element to engage an attachment nut to be rotated on a threaded element to pull the attachment nut and compression sleeve off of the pipe.

Various apparatus and tools may currently be known for removal of compression sleeves from pipes. These tools may have a sleeve body with a threaded rod threadably engaged at one end and passing longitudinally through the sleeve body. The sleeve body may have a cavity with an opening for insertion of a pipe end therein. The threaded rod may have a disk or bearing device on one end and a torque handle on the second end. Such apparatus may be threadably attached to an attachment nut engaging a compression sleeve, the threaded rod may be rotated in the sleeve body to move the sleeve body and attachment nut longitudinal on the pipe end to pull the attachment nut and compression sleeve off of the pipe end.

SUMMARY OF THE INVENTION

The present invention is directed to apparatus for removal of compression sleeves from cylindrical objects. An outer body may have a bore longitudinally therethrough, an exteriorly threaded attachment end, and a second end with an interior wall of the bore threaded adjacent the second end. An inner element may have a bore longitudinally therethrough and may have a threaded end for threadable engagement with the outer body threaded interior wall. A push rod may have a force portion for insertion in the inner element bore and may be attached to the inner element. A push portion of the push rod may be slidably disposed in the outer body bore when the inner element may be threadably engaged in the outer body. The inner element may have a torque portion.

These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
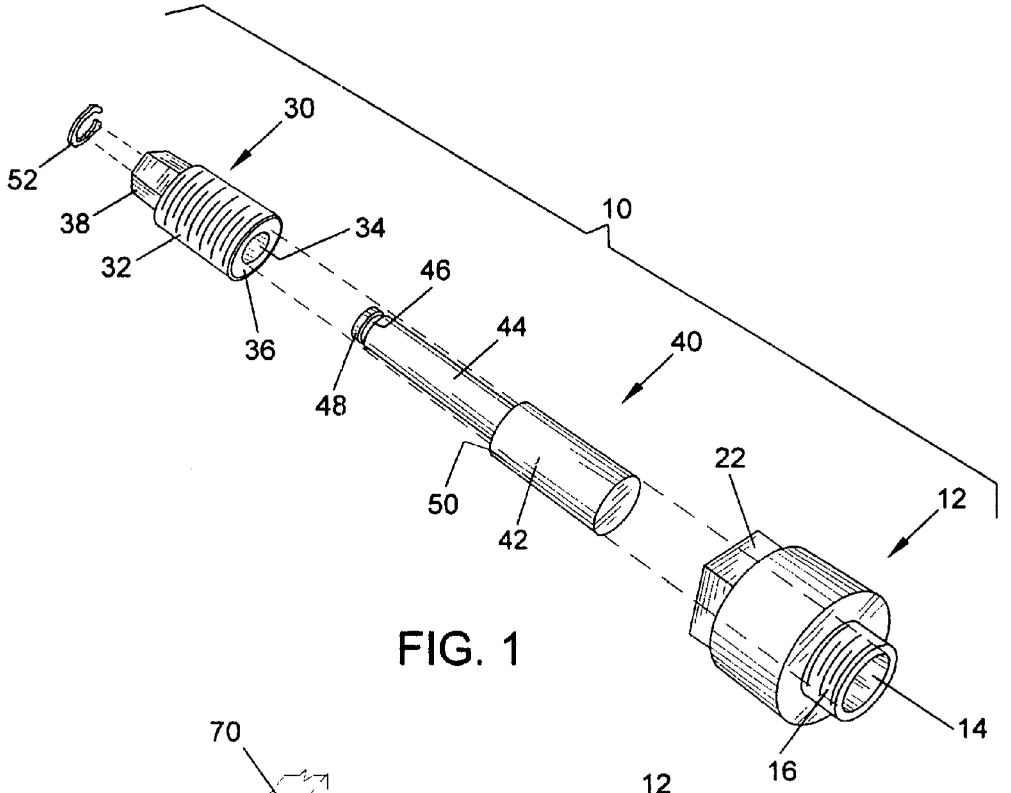
FIG. 1 illustrates a perspective exploded view of the removing apparatus according to an embodiment of the invention.
Figure 2:
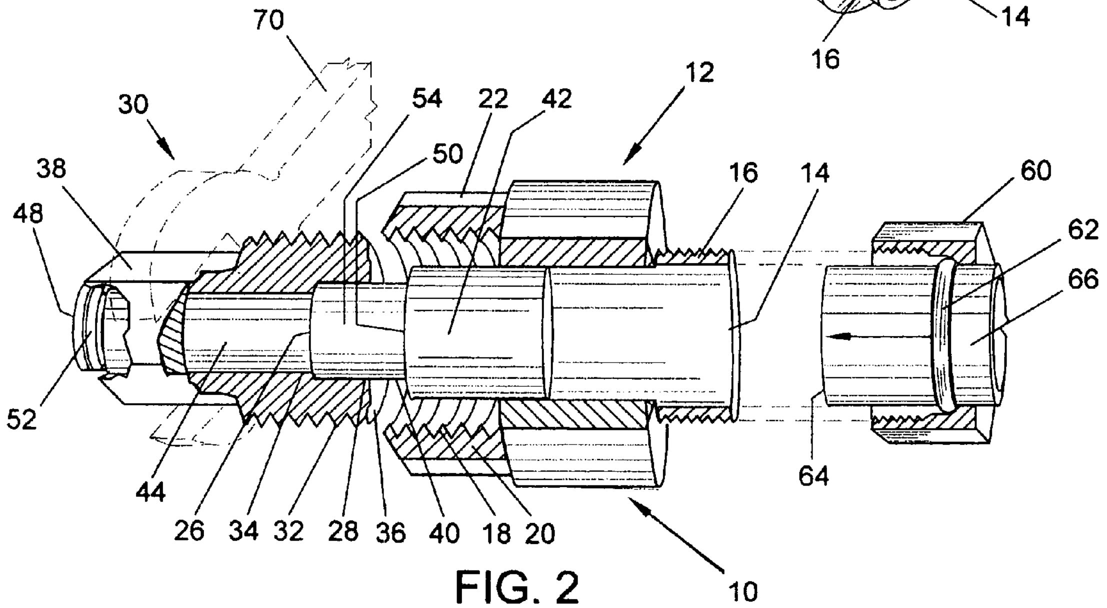
FIG. 2 illustrates a side perspective partial cross-section view of the removing apparatus according to an embodiment of the invention.

Referring to FIGS. 1 and 2, a compression sleeve removing apparatus 10 may have an outer body 12 that may be cylindrical and may have a bore 14 longitudinally therethrough. The outer body may have a threaded attachment end 16 with threads sized to engage an attachment nut 60. The interior wall 18 of the bore 14 at a second end 20 may be threaded for threadable receipt of a rotational inner element 30 having a threaded end 32.

The inner element 30 may have a bore 34 longitudinally therethrough. A push rod 40 that may be cylindrical may have a push portion 42 and a force portion 44. The force portion 44 may have a smaller diameter than the push portion 42 and the push portion 42 may be sized to abut a pipe end 64 of a pipe 66.

The push rod 40 may have a groove 46 that may be an annular groove adjacent a fastener end 48. The force portion 44 may be slidably inserted in the bore 34 of the inner element 30 such that a step 50 or offset may abut the push end 36 of the inner element 30. The fastener end 48 and groove 46 may protrude out of the bore 34 and an attachment ring 52 may be positioned in the groove 46 to retain the push rod 40 in the bore 34. The push rod 40 may rotate in the bore 34.

The inner element 30 with push rod 40 rotatably attached may be threadably inserted in the second end 20 of the outer body 12 and the push portion 42 may be disposed in the bore 14 of the outer body 12.

In use, the attachment end 16 of the outer body 12 may be threadably attached to an attachment nut 60 that may have a compression sleeve 62 positioned therein on a pipe 66. A torque portion 22 of the outer body 12 may be shaped to allow use of a wrench to tighten the outer body 12 to the attachment nut 60.

Alternatively the outer body 12 except for the attachment end 16 may be shaped for use of a wrench for tightening, for example, the outer body 12 surface may be a square, hexagonal, octagonal or the like surfaced structure.

Attachment of the removing apparatus 10 may position the pipe end 64 and a portion of the pipe 66 in the bore 14 of the outer body 12 to abut the push portion 42 of the push rod 40. A wrench 70 may be positioned on a torque portion 38 of the inner element 30 to rotate the inner element 30 relative to the outer body 12. Because of the threaded engagement of the elements 12, 30, the push rod 40 may be forced outwardly of bore 14 of the outer body 12 thereby causing the attachment nut 60 and compression sleeve 62 to be pulled off of the pipe 66 at the pipe end 64.

The push rod 40 may have an intermediate portion 54 between the push portion 42 and force portion 44 with the intermediate portion 54 having a diameter smaller than the diameter of the push portion 42 and larger than the diameter of the force portion 44. When the push rod 40 may be inserted in the bore 34 of the inner element 30, a portion of the intermediate portion 54 may be positioned in a larger diameter portion 28 of bore 34 to abut a step 26 of bore 34.

While the invention has been particularly shown and described with respect to the illustrated embodiments thereof, it will be understood by those skilled in the art that the foregoing and other changes in form and details may be made therein without departing from the spirit and scope of the invention.

I claim:

1. An apparatus for removal of compression sleeves from cylindrical objects comprising:

an outer body having longitudinally a first bore therethrough and having an attachment end exteriorly threaded and a second end with an interior wall of said first bore threaded adjacent to said second end;

an inner element having longitudinally a second bore therethrough and having a threaded end for threadable engagement with said interior wall;

a push rod with a force portion inserted in said second bore and attached to said inner element and with a push portion slidably disposed in said first bore when said inner element is threadably engaged with said outer body; and said inner element having a torque portion.

2. The apparatus as in claim 1 wherein said push rod is rotatably disposed in said second bore and is attached by a first step abutting a push end of said inner element and a fastener end having a groove therein with an attachment ring disposed in said groove to abut said torque portion.

3. The apparatus as in claim 1 wherein said torque portion is a plurality of outer surface flat surfaces for engagement of a rotating tool.

4. The apparatus as in claim 1 wherein said second end of said outer body has a plurality of outer surface flat surfaces for engagement of a rotating tool.

5. The apparatus as in claim 1 wherein:

said push rod has an intermediate portion between said push portion and said force portion with said intermediate portion having a diameter smaller than a diameter of said push portion and larger than a diameter of said force portion; and said second bore of said inner element having a first portion approximately the diameter of said intermediate portion adjacent said push end and a second portion approximately the diameter of said force portion extending from a second step through said torque portion.

6. The apparatus as in claim 1 wherein said outer body is generally cylindrical in form.

7. The apparatus as in claim 1 wherein said inner portion is generally cylindrical in form.

8. The apparatus as in claim 1 wherein said push rod is generally cylindrical in form.

* * * * *